United States Patent [19]

Mayer et al.

[11] 4,345,307
[45] Aug. 17, 1982

[54] RECTANGULAR HEADLAMP RETAINER

[76] Inventors: William R. Mayer, 112 Oak, Rochester, Ill. 62563; Alton E. Runion, Rte. 10, Rochester, Ill.

[21] Appl. No.: 148,698

[22] Filed: May 12, 1980

Related U.S. Application Data

[63] Continuation-in-part of Ser. No. 935,490, Aug. 21, 1978.

[51] Int. Cl.³ ............................................. F21V 7/00
[52] U.S. Cl. .................................... 362/306; 362/80; 362/310; 362/369; 362/390
[58] Field of Search ................ 362/390, 80, 306, 310, 362/369

[56] References Cited

U.S. PATENT DOCUMENTS

| | | | |
|---|---|---|---|
| 3,201,581 | 8/1965 | Hirsch | 362/390 |
| 3,222,512 | 12/1965 | Dickson | 362/390 |
| 4,231,081 | 10/1980 | Borruso | 362/390 |

Primary Examiner—Stephen J. Lechert, Jr.

[57] ABSTRACT

A retainer assembly for a rectangular vehicle headlamp consisting basically of a one-piece rubber molding having an outer base member and a rectangular lamp support pivotally supported on the base member by an integral web portion extending horizontally between the base to the top of the rectangular lamp support approximately midway along its axial length. This arrangement permits pivotal movement of the lamp support portion with respect to the base about a horizontal axis for adjusting the angular position of the headlamp and also providing an excellent vibration and shock mount for the lamp with respect to the associated vehicle. An adjusting assembly at the lower part of the lamp support portion provides the necessary headlamp adjustment. A metal frame is connected to the base portion and provides the rigidity necessary to fasten the retainer assembly and headlamp therein onto the vehicle body.

In one embodiment the base member is rectangular in configuration and has a metal insert molded frame for support. The adjusting assembly is positioned between the rectangular base and the lower portion of the rectangular lamp support and includes a biasing spring.

In another embodiment, the base member is a horizontal bar portion at the top of the rectangular lamp support. A pivotal adjusting assembly reacts against the lower part of the lamp support and directly against the vehicle body.

In a third embodiment of the present invention, the base member is defined by two integral lobes with mounting eyelets at the top of the rectangular lamp support.

30 Claims, 16 Drawing Figures

RECTANGULAR HEADLAMP RETAINER

RELATED APPLICATION

This application is a continuation-in-part of our application Ser. No. 935,490, filed Aug. 21, 1978 and entitled RECTANGULAR HEADLAMP RETAINER.

BACKGROUND OF THE PRESENT INVENTION

In off-the-road vehicles where rough terrain is frequently traveled, it is often-times desirable to provide a headlamp retainer assembly that has a substantial amount of resiliency to prevent damage to the headlamp and also to prevent loosening of the parts in the headlamp assembly. There have been many such designs provided in the past but these have to a large extent been confined to retaining assemblies for circular, rather than rectangular headlamps. One such design is shown in the Mead et al. U.S. Pat. No. 3,065,340 in which the circular headlamp is supported in a circular annular support connected by an integral annular web portion to a substantially fixed base portion. This construction has the disadvantage that it is not readily adaptable with a device for adjusting the vertical angular position of the headlamp which is desirable in many applications.

Attempts to make shock mounted circular headlamp retainer assemblies adjustable have resulted in very complicated and costly constructions. For example, in the Goodyear et al. U.S. Pat. No. 3,852,586, a shock mounting arrangement is provided for a circular headlamp assembly that includes two annular metal retaining cups that engage the headlamp and an isolated circular rubber grommet that provides the necessary pivotal action for vertical adjustment of the headlamp. The disadvantage in this construction, in addition to requiring very many separately formed parts, is that it does not provide the necessary support for the headlamp because of the very small rubber grommet between the fixed portion of the assembly and the pivotal retaining cups.

It is a primary object of the present invention to ameliorate these problems noted above in prior art shock headlamp retainer assemblies.

SUMMARY OF THE PRESENT INVENTION

According to the present invention, a shock retainer assembly is provided for a rectangular headlamp that permits vertical pivotal adjustment of the headlamp while at the same time providing improved support for the headlamp over prior art constructions. The headlamp retainer is essentially a one-piece rubber molding of generally rectangular construction. In one embodiment a rectangular outer base portion is provided with an insert molded metal frame that has fastener receiving openings for attaching the entire assembly with the headlamp mounted therein to the associated vehicle body or frame. This molding has an integrally formed rectangular lamp supporting portion within the base portion that is connected to the base portion by a horizontal integral web from the top of the base portion extending rearwardly to a point atop the lamp supporting portion. The necessary pivotal adjustability of the lamp supporting portion is provided by a threaded screw and spring assembly that is retained in a U-shaped slot in the lower part of the metal frame and threadedly engages a downwardly projecting integral lug on the bottom of the lamp portion.

In another embodiment the base portion is an elongated straight horizontal member adjacent the top of the rectangular lamp receiving portion that attaches directly to the vehicle. An integral web with elongated openings therethrough extends between this elongated base portion and the lamp receiving portion. Pivotal movement of the lamp receiving portion is achieved by an adjusting screw threadedly received in an insert in an integral projection on the lower part of the lamp receiving portion. This adjusting screw is supported and retained in a spacer assembly fastened directly to the vehicle.

The integral web interconnection in both embodiments provides the dual functions of defining the pivotal axis and vibration mount for the lamp portion in the base portion. The web provides desirable vibration dampening characteristics in all directions.

In a third embodiment, the base portion is defined by separate spaced integral lobes with eyelets therethrough adjacent the top of the rectangular lamp receiving portion and these attach directly to the vehicle.

An important aspect of the present invention is that, due to the unique construction of the base portion and the lamp supporting portion, the web portion extends a substantial distance across the length of the top of the lamp support portion providing improved support for the headlamp mounted therein.

DETAILED DESCRIPTION OF THE PREFERRED EMBODIMENTS

Figures 1, 2, 3, 4:
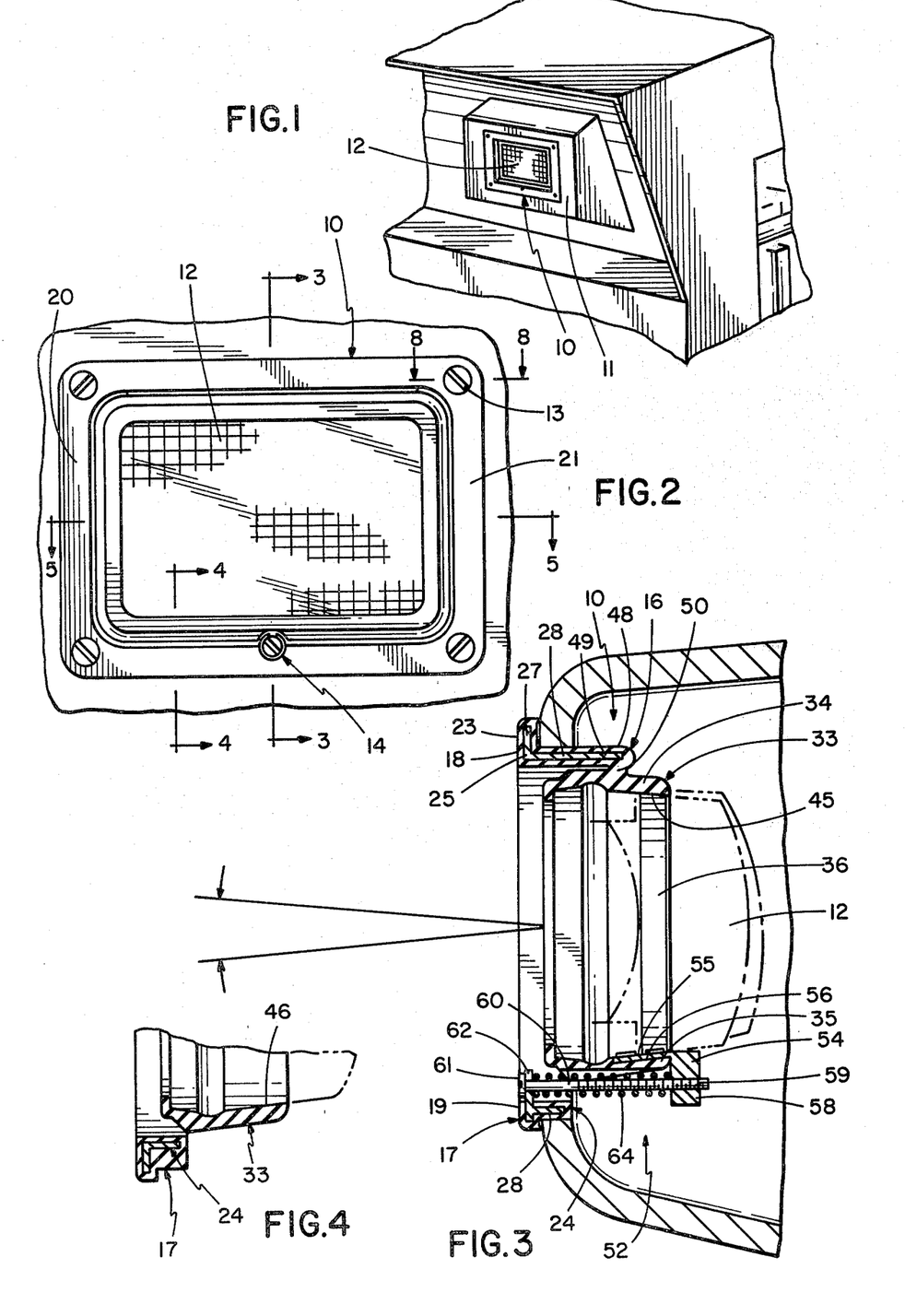
FIG. 1 is a fragmentary view of the front end of a vehicle showing one embodiment of the present rectangular headlamp retainer assembly in position.
FIG. 2 is an enlarged front view of the retainer assembly shown in FIG. 1.
FIG. 3 is a cross-section taken generally along line 3—3 of FIG. 2.
FIG. 4 is a fragmentary section taken generally along line 4—4 of FIG. 2 illustrating the lower part of the retainer somewhat off-center.

Referring to the drawings and particularly the embodiment illustrated in FIGS. 1 to 8, the present shock retainer assembly 10 is illustrated mounted to a front panel 11 of a vehicle with a rectangular headlamp 12 mounted in the retainer assembly. The retainer assembly 10, as shown in FIG. 2, receives four fasteners 13 which connect the retainer assembly and headlamp 12 to the front panel 11 of the vehicle. A spring biased adjustment assembly 14 is provided at the bottom of the retainer assembly 10 that provides the necessary vertical adjustment or alignment of the headlamp 12 about a horizontal axis with respect to the associated vehicle.

Figure 5:
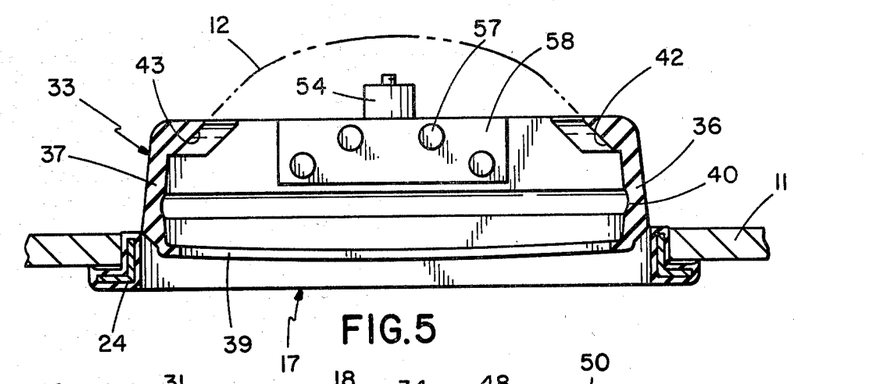
FIG. 5 is a cross-section taken generally along line 5—5 of FIG. 2 looking downwardly on the retainer assembly.

As seen more clearly in FIGS. 3, 4 and 5, the retainer assembly 10 consists basically of a one-piece rubber molding 16. This molding has a rectangular base portion 17 with an upper leg 18 and a lower leg 19 interconnected by vertical side legs 20 and 21. The base portion 17 is L-shaped in cross-section and includes a vertical flange 23 and an integral horizontal flange 24 having a short length except adjacent top length 18 where it extends further rearwardly, as will appear hereinbelow.

To provide rigidity for the base portion 17 as well as the entire assembly 10, a rectangular metal plate 25 is insert molded in molding 16. Plate 25 is also L-shaped in cross-section and has a vertical flange 27 and a horizontal flange 28 that extend rearwardly a short distance as shown at the bottom of FIG. 3 throughout the periphery of the base 17 except across the upper length 18 where it extends further rearwardly as shown in FIG. 3.

The plate 25 has apertures 30 adjacent each corner thereof adjacent openings 31 in the rubber molding 16 as seen in FIG. 5 to permit the retainer assembly to be fixed by fasteners 13 to the vehicle body. A lamp support 33 is suspended from the upper portion of the supporting base 17 and it is an integral part of rubber molding 16. The lamp support has a generally rectangular configuration with an upper wall 34, a lower wall 35 and side walls 36 and 37 (see FIGS. 3, 5 and 6). The walls 34, 35, 36 and 37 all have generally the same cross-section including a forward inwardly directed lip 39 for retaining lamp 12 in a forward direction, and a rounded recess 40 on the inside of the walls entirely around the lamp support 33 to assist in holding the lamp in position. The side walls 36 and 37 have inwardly tapered portions 42 and 43 for engagement with the rear portion of lamp 12, and the top and bottom walls 34 and 35 have somewhat lesser tapered surfaces 45 and 46 (see FIG. 4) for engaging the rear portion of the top and bottom of lamp 12.

Figures 6, 7, 8:
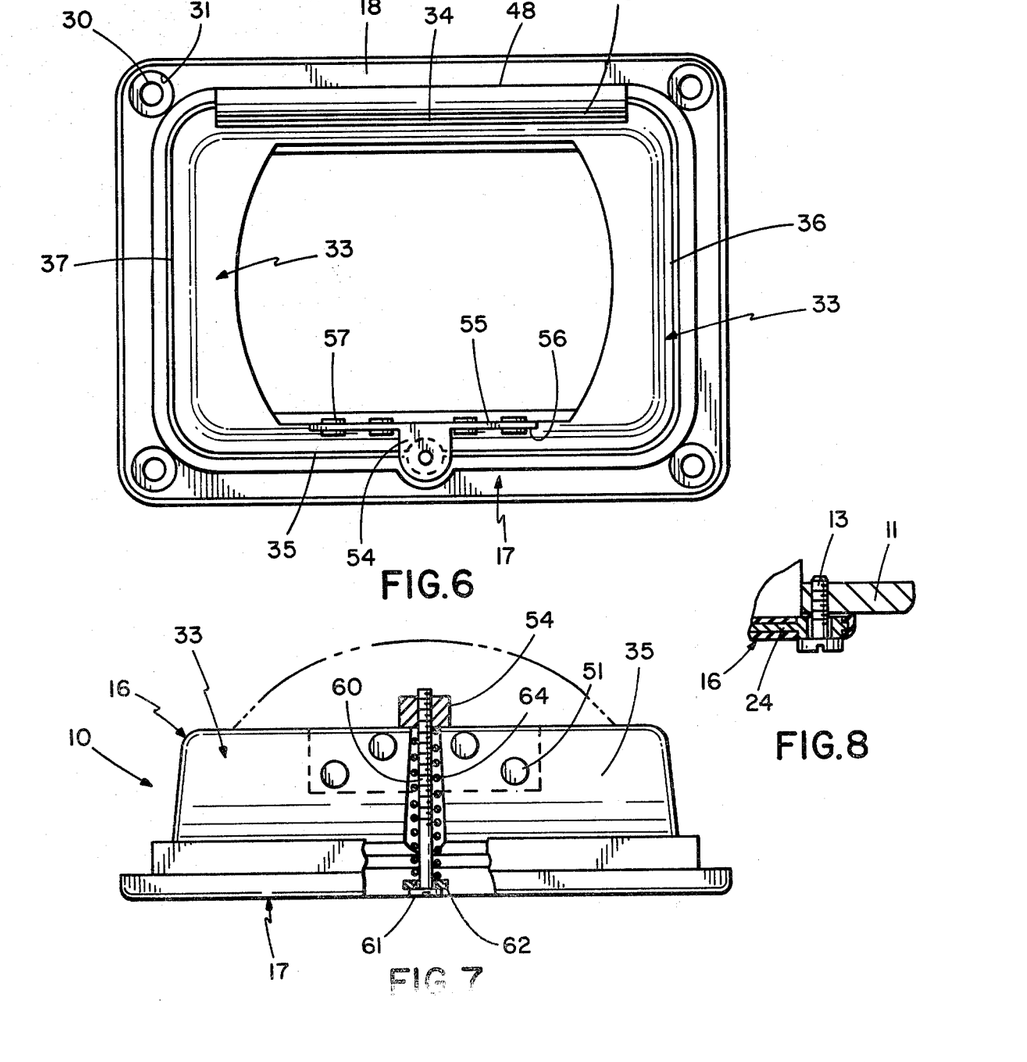
FIG. 6 is a rear view of the retainer assembly.
FIG. 7 is a bottom view partly in section illustrating an adjusting spring assembly for the retainer assembly.
FIG. 8 is a fragmentary section adjacent one of the openings that fastens the retainer assembly to the vehicle also illustrating an insert molded plate.

The lamp support 33 is pivotally mounted about a horizontal axis on the base 17 to permit vertical angular adjustment of lamp support 33 and also to provide a vibration absorbing interconnection. Toward this end, the flange 24 adjacent upper base leg 18 is straight and extends across almost the entire width of the lamp support 33 as seen in FIG. 6. As noted above, flange 28 of plate 25 has an extension 49 within rubber flange 24 for the purpose of rigidifying this section. The plate 49 is, however, sufficiently thin to permit limited flexing of section 48 under normal shock loads and during pivotal adjustment of the lamp support 33. Flange 24 is interconnected to the top wall 33 of the lamp support by an integral web 50 that extends coextensively with the upper extended portion of flange 24. The web 50 is sufficiently thin to permit the free pivotal movement of the lamp support 33 about a horizontal axis.

An adjustment assembly 52 is provided for pivoting the lamp assembly 33 about a horizontal axis with respect to the base 17 and providing the necessary vertical adjustment to the headlamp 12. Toward this end, a bracket 54 is provided having a flat flange portion 55 mounted in a recess 56 in the inner surface of bottom wall 35 of lamp support 33 as seen in FIGS. 3,5 and 6 by suitable rivets 57. The bracket 54 has a downwardly extending boss 58 with a threaded aperture 59 that receives an elongated adjusting screw 60. Adjusting screw 60 has a flat slotted head 61 that reacts against an upstanding slotted projection 62 formed integrally with plate flange 27. A coil spring 64 surrounds adjusting screw 60 and reacts at one end against projection 62 and the other end against boss 58 serving to continuously urge the bracket 54 and the lamp support 33 in a counterclockwise direction as shown in FIG. 3. Fastener 62 may be adjusted as desired to place the lamp support 33 in any angularly adjusted position, within the structural limits of the assembly, and spring 64 serves to maintain that position but at the same time it permits limited clockwise movement of the headlamp support 33 encountered during periods of shock experienced by the vehicle, thereby assisting in shock absorption. Spring 64 returns the lamp support 33 to the predetermined position set by adjusting screw 60.

In FIGS. 9 to 14 another embodiment of the present headlamp retainer assembly 110 is illustrated mounted to a vertical vehicle panel 111 from the rear side of the panel. This is in contrast to the embodiment illustrated in FIGS. 1 to 8 where the retainer assembly 10 is positioned within the vehicle panel 11 from the front of the panel.

Figures 10, 11:
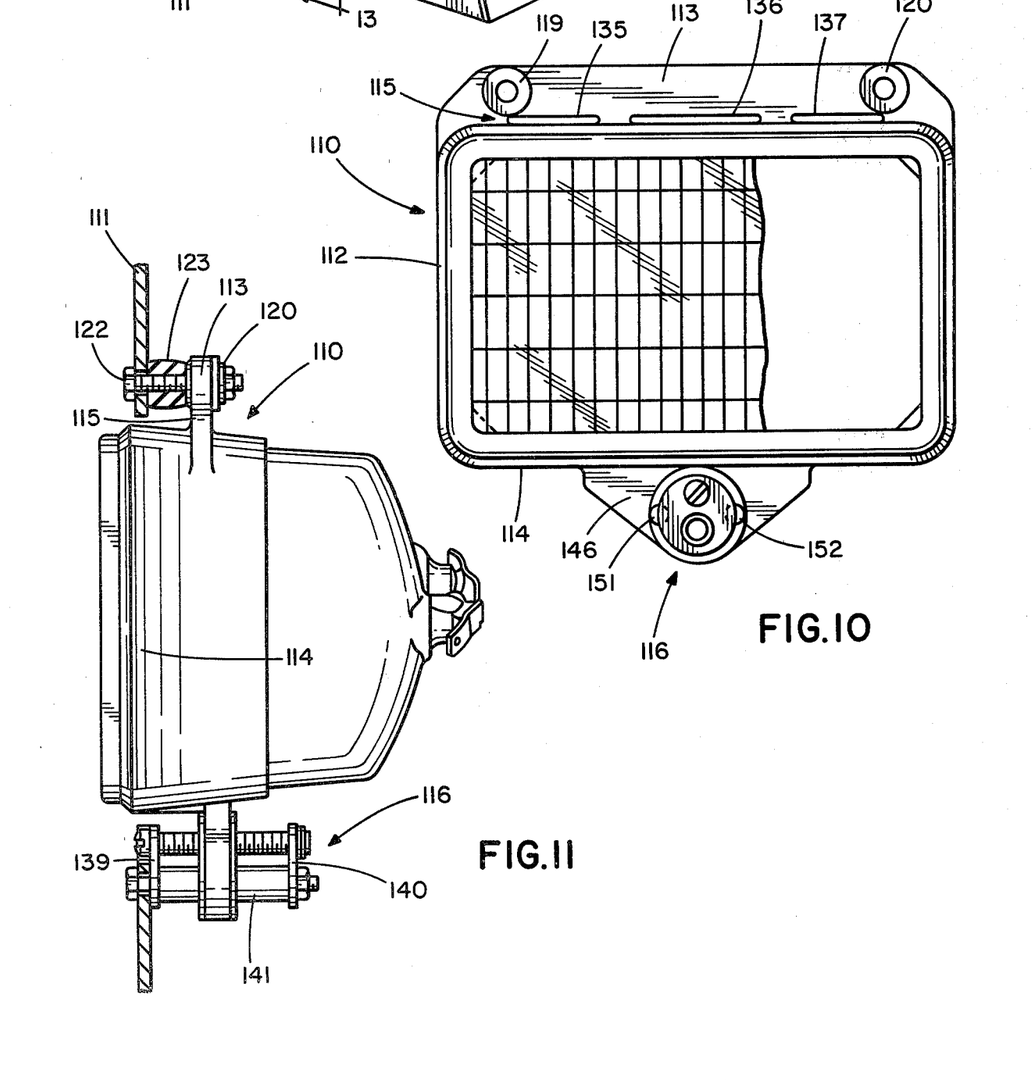
FIG. 10 is an enlarged front view of the retainer assembly shown in FIG. 9 with the lamp partly broken away.
FIG. 11 is a side view of the retainer assembly shown in FIG. 10 mounted to a vehicle body panel.

As seen in FIGS. 10 and 11, the retainer assembly 110 includes a one-piece elastomeric molding 112 having a fixed elongated upper bar portion 113, a rectangular lamp receiving portion 114 and a flexible integral hinge web 115 interconnecting the elongated fixed portion 113 and the rectangular lamp receiving portion 114, with pivotal adjusting movement of the lamp receiving portion 114 being effected by an adjusting assembly 116.

Figure 12:
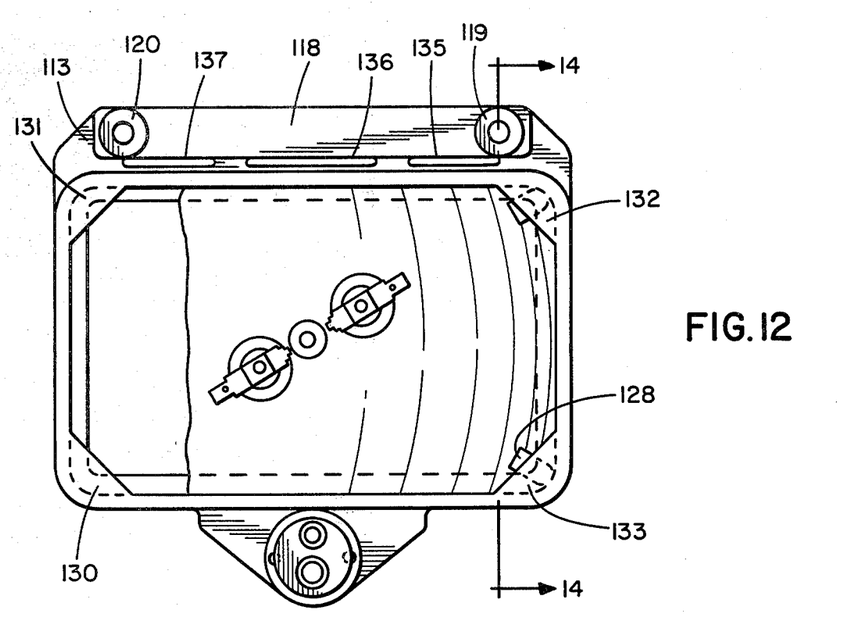
FIG. 12 is a rear view of the retainer assembly shown in FIG. 10 with the lamp partly broken away.
Figure 13:
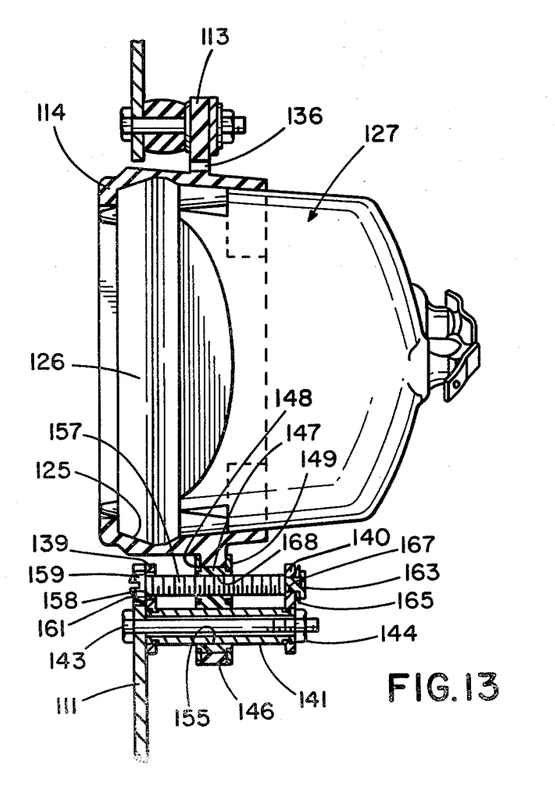
FIG. 13 is an enlarged cross-section of the retainer assembly mounted to a vehicle, taken generally along line 13—13 of FIG. 9.
Figure 14:
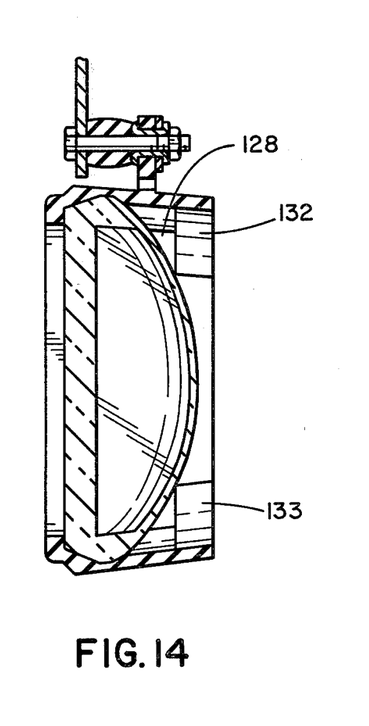
FIG. 14 is a cross-section taken generally along line 14—14 of FIG. 12.

As seen in FIGS. 11 and 12, the elongated base or bar portion 113 is adapted to be connected to the back side of vehicle panel 111 and has an elongated rigid metal bar 118 fixed thereto by spaced eyelets 119 and 120. Base 113 is attached to panel 111 by two spaced fasteners 122 that extend through the panel 111, a spacing grommet 123 and through the openings in the eyelets 119 and 120. Since the bar 113 is relatively inflexible, the base portion 113 is substantially fixed with respect to the panel 111. As seen in FIG. 13, the lamp receiving portion 114 has a rectangularly shaped internal recess 125 that receives a forward rim 126 on lamp 127 to assist in locating the lamp within the lamp retainer portion. Viewing FIG. 12, the lamp 127 has integral projections 128 at each of its four corners which are locked axially in position by four integral lugs formed internally at the rear end of the lamp retainer portion 114 as seen clearly in FIGS. 12 and 14.

The web 115 interconnects the base portion 113 and the lamp receiving portion 114 and serves the same function as the web 50 in the FIGS. 1 to 8 embodiment. It is sufficiently flexible to permit the angular adjusting movement of the lamp retainer portion 114 with respect to the base portion 113 and also to provide the desirable shock mounted characteristic for the lamp portion 114. To increase the flexibility of the web 115, it has three elongated apertures 135, 136 and 137 therethrough.

The adjusting assembly 116 effects the pivotal adjusting movement of the lamp retainer portion 114 with respect to the base portion 113 about a horizontal axis extending approximately through the hinge web 115. Adjusting assembly 116 is seen to include a pair of spaced circular discs 139 and 140 separated by a spacer tube 141 staked at either end to the discs 139 and 140 as shown clearly in FIG. 13.

The front surface of disc 139 engages the rear surface of vehicle panel 111 and is fixed thereto by an elongated fastener 143 extending through panel 111 and through spacer tube 141 that receives a cooperating fastening element 144 engaging the rear surface of circular disc 140.

The lower surface of the headlamp retainer 114 has a downwardly extending generally triangularly shaped projection 146 that carries a generally circular plastic insert 147 held therein by circular plates 148 and 149 held together by spaced rivets 151 and 152 as viewed in FIG. 10.

The insert 147 has a bore 155 therethrough that is slidably received on the spacer tube 141 to provide a guiding and supporting seat for the lamp receiving portion 114 at its lower end on the spacer tube 141, while at the same time permitting free sliding movement thereon in the plane of FIG. 13.

An adjusting screw 157 is provided that shifts the lamp retainer 114 along spacer tube 141 to provide the desired pivotal movement of lamp 127. Toward this end, the left end of the screw 157 is freely rotatable in an aperture 158 in the front disc plate 139 and its head 159 projects through an opening 161 in vehicle panel 111. Aperture 158 has no threads and merely serves to position the forward end of screw 157 laterally and axially. The rear end of screw 157 extends through an opening 163 in rear disc plate 140 and a Belleville spring washer 165 reacts between the disc plate 140 and head 167 on the fastener to remove end play from the screw 157.

The screw 157 is threadedly received in a threaded aperture 168 in the insert 147 so that upon rotation of the fastener head 159 the insert 147 and the lamp projection 146 will be drawn or pushed along the spacer tube 141 in the plane of FIG. 13 to effect the necessary desired angular movement of the lamp retainer 114 about the horizontal pivot axis provided by hinge web 115.

Figure 15:
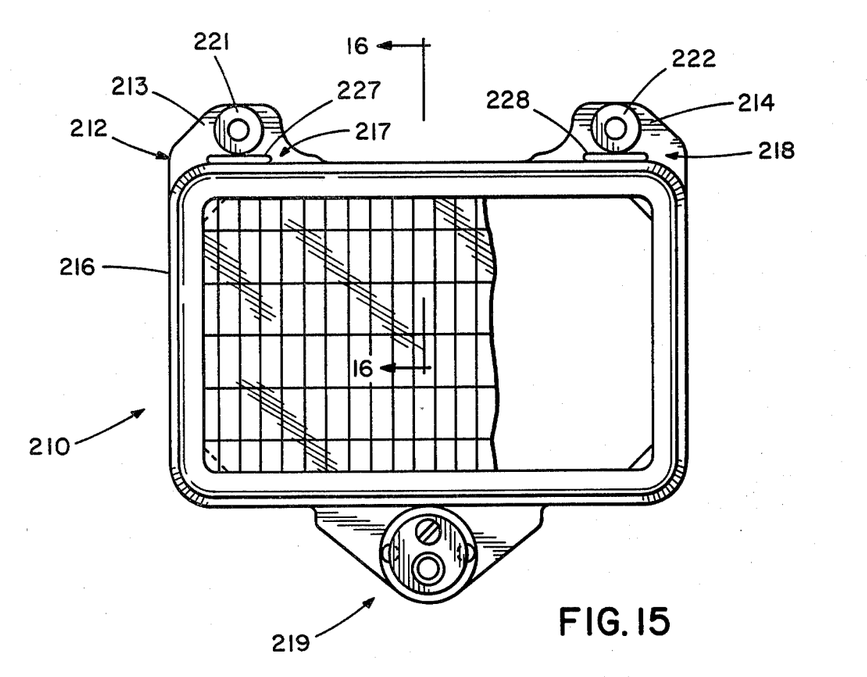
FIG. 15 is an enlarged front view of a third embodiment of the present retainer assembly.
Figure 16:
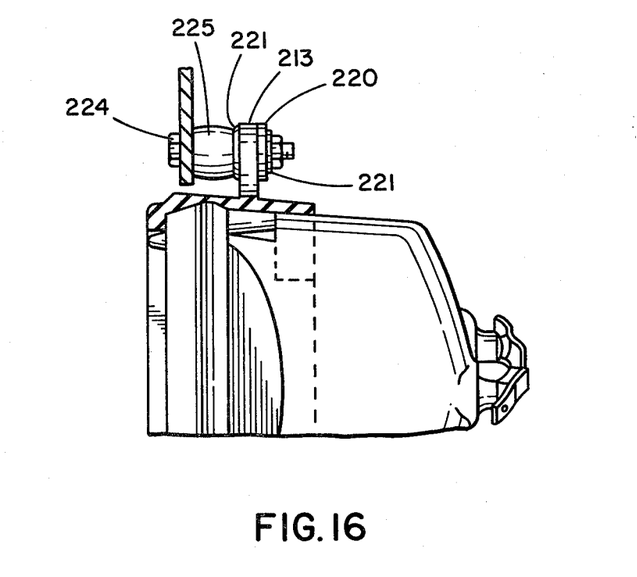
FIG. 16 is a fragmentary view taken generally along line 16—16 of FIG. 15.

In FIGS. 15 and 16 a third embodiment of the present headlamp retainer assembly 210 is illustrated and is seen to be generally similar to the FIGS. 9 to 14 embodiment except that spaced mounting lobes replace the continuous elongated base or bar portion 113 in the former embodiment.

As seen in FIGS. 15 and 16, the retainer assembly 210 includes a one-piece elastomeric molding 212 having spaced lobe portions 213 and 214, a rectangular lamp receiving portion 216, and flexible integral hinge webs 217 and 218 interconnecting the lobes 213 and 214 with the rectangular lamp receiving portion 216, with pivotal adjusting movement of the lamp receiving portion 216 being effected by an adjusting assembly 219.

Figure 9:
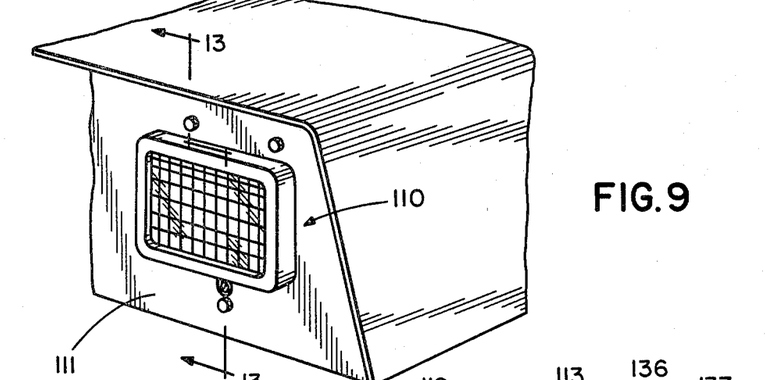
FIG. 9 is a perspective view of another embodiment of the present retainer assembly shown mounted in a vehicle body panel.

The spaced lobe portions 213 and 214 are adapted to be connected to the backside of a vehicle panel, such as panel 111 in FIG. 9, and each as a rigid metal washer 220 fixed thereto by spaced eyelets 221 and 222. Lobes 213 and 214 are attached to the vehicle panel by two spaced fasteners 224 that extend through the panel, a spacing grommet 225, and through the openings in the eyelets 221 and 222. Since the washers 220 are relatively inflexible the upper portions of the lobes 213 and 214 are substantially fixed with respect to the vehicle panel.

The lamp receiving portion 216 is substantially identical to the lamp receiving portion 114 illustrated in FIGS. 10 to 14.

The webs 217 and 218 interconnect the lobes 213 and 214 with the lamp receiving portion 216 and serve the same function as the web 115 in the FIGS. 9 to 14 embodiment. They are sufficiently flexible to permit the angular adjusting movement of the lamp retainer portion 216 with respect to the lobes 213 and 214 to provide the desirable vibration and shock mount characteristics for the lamp portion 216. To increase and control the flexibility of the webs 216 and 218, each has an elongated horizontal slot 227 and 228 therethrough centered with respect to the eyelets 221 and 222.

The adjusting assembly 219 effects the pivotal adjusting movement of the lamp retainer portion 114 with respect to the lobes 213 and 214 about a horizontal axis extending approximately through the hinge webs 217 and 218. Adjusting assembly 219 is substantially identical to the adjusting assembly 116 illustrated and described in connection with FIGS. 9 to 14.

What is claimed is:

1. A shock mounting retainer assembly for a rectangular lamp, comprising: a generally rectangular supporting base adapted to be fixed to a vehicle, a generally rectangular lamp support mounted adjacent the supporting base and adapted to hold the rectangular lamp, a substantially straight horizontal vibration absorbing hinge constructed of a resilient material interconnecting the supporting base and the lamp support to provide a shock mount between the lamp and the associated vehicle, at least one of said supporting base and said lamp support being constructed of an elastomeric material, said vibration absorbing hinge being integral with at least one of said supporting base and said lamp support, said hinge being located only on one of the adjacent sides of the supporting base and said lamp support so that the lamp support is free to pivot with respect to the supporting base, and a horizontal adjustment mechanism interconnecting the supporting base and said lamp support on the sides thereof opposite the hinge so that upon adjustment of the mechanism the lamp support will pivot about the hinge with respect to the supporting base.

2. A shock mounting retainer assembly for a rectangular lamp as defined in claim 1, wherein the vibration absorbing hinge is constructed of rubber.

3. A shock mounting retainer assembly for a rectangular lamp as defined in claim 1, wherein the adjustment mechanism includes a spring return means between the supporting base and the lamp support for continuously urging the lamp support to a reference position.

4. A shock mounting retainer assembly for a rectangular lamp, comprising: a one piece elastomeric rubber molding, said one piece rubber molding including; a rectangular base portion adapted to be fixed to a vehicle, a smaller rectangular lamp supporting portion positioned generally within the base portion, a substantially straight horizontally extending integral web portion interconnecting the base portion and the lamp supporting portion extending only along one of the adjacent sides of the base portion and the lamp supporting portion and having sufficient resiliency to permit pivotal movement between the base portion and the lamp supporting portion, and an adjustment mechanism between the base portion and the lamp supporting portion on the sides thereof opposite the web portion for continuously urging the lamp supporting portion to a plurality of predetermined positions.

5. A shock mounting retainer assembly for a rectangular lamp as defined in claim 4, wherein the web portion has a horizontally extending length from the base portion and a vertically extending length from the horizontally extending length to the lamp supporting portion.

6. A shock mounting retainer assembly for a rectangular vehicular lamp, comprising: a one piece rubber molding, said one piece rubber molding including; a rectangular base portion adapted to be fixed to a vehicle, a smaller rectangular lamp supporting portion positioned generally within the base portion, a substantially straight horizontally extending integral web portion interconnecting the base portion and the lamp supporting portion extending only along one of the adjacent sides of the base portion and the lamp supporting portion and having sufficient resiliency to permit pivotal movement between the base portion and the lamp supporting portion, an adjustment mechanism interconnecting the base portion and the lamp supporting portion for adjusting the position of the lamp supporting portion with respect to the base portion, and a rectangular metal frame insert molded in the base portion, said metal frame having a plurality of fastener receiving openings therein for receiving fasteners to attach the retainer assembly to the vehicle.

7. A shock mounting retainer assembly for a rectangular vehicular lamp, comprising: a one piece rubber molding, said one piece rubber molding including; a rectangular base portion adapted to be fixed to a vehicle, a smaller rectangular lamp supporting portion positioned generally within the base portion, a substantially straight horizontally extending integral web portion interconnecting the base portion and lamp supporting portion extending only along one of the adjacent sides of the base portion and the lamp supporting portion and having sufficient resiliency to permit pivotal movement between the base portion and the lamp supporting portion, a rectangular metal frame insert molded in the base portion, said metal frame having a plurality of fastener receiving openings therein for receiving fasteners to attach the retainer assembly to the vehicle, and an adjustment mechanism including a spring assembly at the side of the molding opposite the web portion to continuously urge the lamp supporting position to a plurality of predetermined angular positions, said spring assembly engaging the metal frame at one end and the lamp supporting portion at the other end.

8. A shock mounting retainer assembly for a vehicular rectangular lamp, comprising: a one piece rubber molding, said one piece rubber molding including; a rectangular base portion having a vertical flange and a horizontal flange, a rectangular lamp supporting portion within said base portion and having an internal opening for receiving a rectangular lamp, an elongated, substantially straight, horizontal integral web portion extending from an upper portion of the base portion horizontal flange, a vertical integral web portion extending from said horizontal web portion and connected to said lamp supporting portion so that the lamp supporting portion is pivotally mounted on the base portion, a rectangular metal frame insert molded in the base portion and having openings for receiving fasteners, said metal frame having a vertical flange and a horizontal flange with the horizontal flange extending into the horizontal web portion for rigidity, and an adjustment mechanism including a spring assembly engaging the lower part of the metal frame and the lower part of the lamp supporting portion opposite the web portions to continuously urge the lamp supporting portion to a predetermined position, said spring assembly being adjustable to vary the position of the lamp supporting portion in the base portion.

9. A shock mounting retainer assembly for a rectangular lamp, comprising: a one piece rubber molding, said one piece rubber molding including; a rectangular base portion adapted to be fixed to a vehicle, a smaller rectangular lamp supporting portion positioned generally within the base portion, a substantially straight, horizontally extending integral web portion interconnecting the base portion and the lamp supporting portion having sufficient resiliency to permit pivotal movement between the base portion and the lamp supporting portion; and adjustable means between said base portion and said lamp supporting portion on the sides thereof opposite the web portion for adjusting the angular position of the lamp supporting portion in the base portion.

10. A shock mounting retainer assembly for a rectangular lamp, comprising: a generally rectangular supporting base adapted to be fixed to a vehicle, a generally rectangular lamp support adapted to receive the rectangular lamp, a substantially straight, horizontal vibration absorbing hinge interconnecting the supporting base and the lamp support only on one of the sides thereof to provide a vibration mount between the lamp and the associated vehicle, and adjustable means between said base and said lamp support for adjusting the pivotal position of the lamp support in the base.

11. A vibration absorbing retainer for a vehicular rectangular lamp, comprising: an integral elastomeric body having a generally rectangular configuration, said body having an elongated first portion adapted to be fixed with respect to the vehicle, said body having a generally rectangular second portion for receiving and supporting the rectangular lamp, said body having an integral web portion interconnecting the first portion and the second portion to permit pivotal movement of the second portion about the first portion and also to vibration mount the second portion, and means positioned on the side of the body opposite the web portion for adjusting the angular position of the second portion with respect to the first portion.

12. A vibration absorbing retainer for a vehicular rectangular lamp as defined in claim 11, wherein the web portion is approximately coextensive in length with the width of the first portion and the second portion.

13. A vibration absorbing retainer for a vehicular rectangular lamp as defined in claim 12, in which the web portion has openings therethrough.

14. A vibration absorbing retainer for a vehicular rectangular lamp as defined in claim 12, in which the web portion is continuous.

15. A vibration absorbing retainer for a vehicular rectangular lamp as defined in claim 11, including a rigid metal member fixed to and extending across the first portion to provide support therefor.

16. A vibration absorbing retainer for a vehicular rectangular lamp as defined in claim 15, including two widely spaced fastener receiving openings extending through the first portion and the metal support member.

17. A vibration absorbing retainer for a vehicular rectangular lamp as defined in claim 11, wherein said web portion has a plurality of horizontally extending openings therethrough.

18. A vibration absorbing retainer for a vehicular rectangular lamp as defined in claim 11, wherein the means for adjusting the angular position of the second portion with respect to the first portion includes an integral projection extending downwardly from the second portion, an insert in the second portion projection having a threaded opening therethrough, a threaded adjusting member threadedly received in the insert opening, and plate means for axially locating the threaded adjusting member with respect to the vehicle so that upon rotation of the adjusting member the second portion holding the lamp may be pivoted about the first portion of the elastomeric body.

19. A vibration absorbing retainer for a vehicular rectangular lamp as defined in claim 18, wherein the plate means includes two spaced plates rotatably supporting the ends of the threaded adjusting member, and a spacer tube extending between and fixed to the spaced plates, said insert having a bore therethrough slidably mounted on the spacer tube.

20. A vibration absorbing retainer for a vehicular rectangular lamp as defined in claim 11, wherein the second portion has internally positioned lugs limiting the rearward axial movement of the lamp in the second portion.

21. A vibration absorbing retainer for a vehicular rectangular lamp as defined in claim 11, wherein the elongated first portion of the body includes spaced lobes, each having mounting openings therethrough.

22. A vibration absorbing retainer for a vehicular rectangular lamp unit, comprising; an integral elastomeric body having a generally rectangular configuration, said body having an elongated fixed portion adapted to be connected to the vehicle, said body having a generally rectangular lamp unit receiving portion, an elongated substantially straight integral web portion interconnecting the elongated fixed portion and the lamp unit receiving portion to provide a vibration absorbing mount for the lamp unit receiving portion and the lamp unit therein, and means positioned opposite the web portion for adjusting the fixed portion with respect to the receiving portion.

23. A vibration absorbing retainer for a vehicular rectangular lamp unit as defined in claim 22, wherein the elongated fixed first portion includes two integral spaced lobes.

24. A vibration absorbing retainer assembly for a vehicular rectangular lamp, comprising; an elongated generally horizontal member adapted to be fixed with respect to the vehicle, a generally rectangular member constructed of elastomeric material for receiving and supporting the rectangular lamp, an elongated substantially straight flexible web between the horizontal member and the generally rectangular member on one of the sides thereof to permit pivotal movement of the rectangular member about a generally horizontal axis, with respect to the horizontal member, and means positioned between the horizontal member and the rectangular member for pivoting the rectangular member with respect to the horizontal member.

25. A vibration absorbing retainer assembly for a vehicular rectangular lamp as defined in claim 24, wherein the horizontal member, the rectangular member and the web are a one-piece elastomeric molding.

26. A vibration absorbing retainer assembly for a vehicular rectangular lamp as defined in claim 24, including a metal bar extending across and fixed to the elongated member for rigidity, and a plurality of fastener receiving openings in the elongated member and the metal bar to receive fasteners for attaching the retainer assembly to the vehicle.

27. A vibration absorbing retainer assembly for a vehicular rectangular lamp as defined in claim 24, wherein the means for pivoting the rectangular member with respect to the horizontal member includes an integral projection extending downwardly from the rectangular member, an insert in the rectangular member projection having a threaded opening therein, a threaded adjusting member threadedly received in the insert threaded opening, and plate means for axially locating the adjusting member with respect to the vehicle so that upon rotation of the adjusting member the rectangular member for holding the lamp may be pivoted about the horizontal member.

28. A vibration absorbing retainer assembly for a vehicular rectangular lamp as defined in claim 27, wherein the plate means includes two spaced discs rotatably supporting the ends of the adjusting member, and a spacer tube extending between and supporting the discs, said insert having a bore therethrough slidably receiving the spacer tube.

29. A vibration absorbing retainer assembly for a vehicular rectangular lamp as defined in claim 24, wherein the rectangular member has internally positioned lugs limiting the rearward movement of the lamp in the rectangular member.

30. A vibration absorbing retainer assembly for a vehicular rectangular lamp, comprising; an elongated base member, a generally rectangular support member for the lamp positioned with one side thereof adjacent the base member, a substantially straight elastomeric hinge interconnecting the base member and the lamp support member to provide for angular positioning of the lamp support member with respect to the base member and also to vibration mount the lamp support member with respect to the base memeber, and an adjustment mechanism between the base member and the support member on the side of the support member opposite the hinge for adjusting the angular position of the support member with respect to base member.

* * * * *